US011509246B2

(12) United States Patent
Wiker et al.

(10) Patent No.: US 11,509,246 B2
(45) Date of Patent: Nov. 22, 2022

(54) BRAKE DEVICE

(71) Applicant: Robert Bosch GmbH, Stuttgart (DE)

(72) Inventors: Juergen Wiker, Stuttgart (DE); Klaus Dengler, Kornwestheim (DE); Matthias Schneider, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 16/965,827

(22) PCT Filed: Jan. 7, 2019

(86) PCT No.: PCT/EP2019/050230
§ 371 (c)(1),
(2) Date: Jul. 29, 2020

(87) PCT Pub. No.: WO2019/154567
PCT Pub. Date: Aug. 15, 2019

(65) Prior Publication Data
US 2021/0058014 A1   Feb. 25, 2021

(30) Foreign Application Priority Data
Feb. 6, 2018 (DE) .................... 10 2018 201 800.6

(51) Int. Cl.
*H02P 3/22* (2006.01)
*H02K 7/106* (2006.01)
*H02P 3/18* (2006.01)

(52) U.S. Cl.
CPC .............. *H02P 3/22* (2013.01); *H02K 7/106* (2013.01); *H02P 3/18* (2013.01)

(58) Field of Classification Search
CPC .... H02P 3/22; H02P 3/18; H02P 25/14; H02P 3/12; H02K 7/106

USPC .......................................... 318/375, 376, 362
See application file for complete search history.

(56) References Cited

U.S. PATENT DOCUMENTS

| 3,848,169 A | 11/1974 | Asano et al. |
| 5,677,586 A | 10/1997 | Horst |
| 7,075,257 B2* | 7/2006 | Carrier ...................... H02P 3/12 318/470 |
| 7,646,155 B2* | 1/2010 | Woods .................... H02P 29/40 318/34 |
| 10,224,838 B2* | 3/2019 | Wiszniewski .......... H02P 25/14 |
| 2008/0143283 A1 | 6/2008 | Nicolussi et al. |

OTHER PUBLICATIONS

International Search Report corresponding to PCT Application No. PCT/EP2019/050230, dated Apr. 2, 2019 (German and English language document) (5 pages).

* cited by examiner

Primary Examiner — David Luo
(74) Attorney, Agent, or Firm — Maginot, Moore & Beck LLP

(57) ABSTRACT

The disclosure relates to a brake device for an electric motor, which has at least one armature winding and at least one field winding, comprising at least one open-loop and/or closed-loop control unit at least for open-loop control and/or closed-loop control of at least one electric current through the armature winding and/or through the field winding. According to the disclosure, in the event of short-circuit braking of the electric motor, the open-loop and/or control-loop unit is intended to reduce, at least temporarily, an electric armature current flowing through the armature winding.

8 Claims, 3 Drawing Sheets

BRAKE DEVICE

This application is a 35 U.S.C. § 371 National Stage Application of PCT/EP2019/050230, filed on Jan. 7, 2019, which claims the benefit of priority to Serial No. DE 10 2018 201 800.6, filed on Feb. 6, 2018 in Germany, the disclosures of which are incorporated herein by reference in their entirety.

BACKGROUND

A brake device for an electric motor, which has at least one armature winding and at least one field winding, with at least one control and/or regulating unit at least for the control and/or regulation of at least one electrical current through the armature winding and/or through the field winding has already been proposed.

SUMMARY

The disclosure is based on a brake device for an electric motor, which has at least one armature winding and at least one field winding, with at least one control and/or regulating unit at least for the control and/or regulation of at least one electrical current through the armature winding and/or through the field winding.

It is proposed that the control and/or regulating unit is provided to at least temporarily reduce an electrical current flowing through the armature winding during short-circuit braking of the electric motor.

The electric motor preferably has a stator and an armature. The stator is in particular designed as a static component, which is particularly free of any self-movement relative to the armature during the operation of the electric motor. The armature is preferably designed as a movably mounted component, in particular as a rotationally movably mounted component, which is movable, in particular rotatably, relative to the stator, especially during operation of the electric motor.

Preferably, the stator and the armature each have at least one base body, preferably made of a variety of interconnected sheet metal layers, in particular electroplate layers. Preferably, the stator has the field winding. Preferably, the armature has the armature winding. Preferably, the field winding and the armature winding are each formed of at least one elongated electrically conductive conduction element, such as of a wire, of a cable or the like. In particular, the conduction element may have an electrically insulating isolation layer. Preferably, the element is essentially wound coil-like around the base body of the stator to form the field winding. Preferably, at least one further conduction element is essentially wound coil-like around the base body of the armature to form the armature winding. In particular, "provided" shall include: specially programmed, designed and/or equipped. This includes that where an object is provided for a particular function, it should be understood in particular that the object fulfills and/or executes this particular function in at least one application and/or operating state.

The electric motor may be designed in particular as an internal rotor motor or as an external rotor motor. Preferably, during the operation of the internal rotor motor an armature of an internal rotor motor rotates surrounded by a stator of the internal rotor motor. Preferably, an armature of an external rotor motor surrounds a stator of the external rotor motor and rotates around the stator during the operation of the external rotor. Preferably, the electric motor is designed as a universal motor. In particular, the electric motor can be operated with both electrical direct voltage and electrical alternating voltage. Preferably, the electric motor has at least one commutator system, in particular for correct energization of the armature winding. In particular, the armature can be set into rotation by correct energization of the electric motor. In particular, the electric motor can drive a drive shaft of a machine tool or the like by means of the rotating armature. For short-circuit braking of the electric motor, preferably the electric motor is electrically short-circuited, in particular the field winding and the armature winding are electrically short-circuited. Preferably, in the event of a short-circuit of the electric motor, a counter-electromotive force acts, which in particular causes an electrical short-circuit current. An electrical short-circuit current flowing through the armature winding during short-circuit braking of the electric motor is in particular the electrical armature current. An electrical short-circuit current flowing through the field winding during short-circuit braking of the electric motor is in particular an electrical field current.

A "control and/or regulating unit" should be understood in particular to mean a unit with at least one control electronics. A "control electronics" should be understood in particular to mean a unit with a processor unit and with a memory unit as well as with an operating program stored in the memory unit. The control and/or regulating unit may be specially designed as a microprocessor, as a microcomputer or as another control and/or regulating unit which appears to be useful to a person skilled in the art. In principle, it is conceivable that the control and/or regulating unit is designed as an electrical or electronic control circuit, as an integrated circuit or the like. Preferably, the control and/or regulating unit is provided for the control and/or regulation of the energization of the electric motor during operation of the electric motor. Alternatively, it is conceivable that the control and/or regulating unit is provided only for the control and/or regulation of short-circuit braking. Preferably, the control and/or regulating unit is provided to initiate the short-circuit braking, in particular depending on a signal, for example, from a sensor, from a user or the like. The control and/or regulating unit is preferably provided to at least temporarily reduce the electrical armature current, in particular an electrical current strength of the armature current, during short-circuit braking of the electric motor, in particular in comparison with an electrical current for the same operating parameters and unregulated short-circuit braking of the electric motor. In particular, the control and/or regulating unit is provided to reduce the electrical armature current at the start of the short-circuit braking. Preferably, the control and/or regulating unit is provided to reduce the electrical armature current for at least 5 ms, particularly preferably for at least 10 ms, from the start of the short-circuit braking. Preferably, the control and/or regulating unit can reduce the electrical armature from the start of the short-circuit braking for more than 10 ms, in particular depending on a system design and/or a powertrain design of a device comprising the brake device. The control and/or regulating unit can preferably reduce the electrical armature current by controlling electrical or electronic components of the brake device, such as resistors, diodes, capacitors, transistors, in particular MOSFETs and/or IGBTs, or the like by at least partial dissipation of the electrical armature current, for example in a freewheeling circuit or the like, and/or by another measure, which appears to be useful to a person skilled in the art. In particular, the control and/or regulating unit can allow an increase in the electrical armature current after a reduction of the armature current.

Due to the embodiment according to the disclosure of the brake device, advantageously a braking time of an electric motor can be minimized reproducibly. Advantageously, brake failures during short-circuit braking can be prevented. Heating of an armature winding and wear on a commutator system can be kept advantageously low. Therefore, less resistant, and therefore advantageously cost-effective components can be used. A cost-effective brake device can be advantageously provided, which allows a plurality of braking operations without overloading in an equal period of time as without armature current reduction.

It is also proposed that the control and/or regulating unit is provided to adjust the electrical current strength of the electrical armature current to be at least temporarily less than the electrical current strength of an electrical field current flowing through the field winding of an electrical brake during short-circuit braking of the electric motor. Preferably, the electrical armature current and the electrical field current exhibit at least substantially the same electrical current strength and at least substantially the same time profile during unregulated short-circuit braking of the electric motor. The control and/or regulating unit is preferably provided to adjust the electrical current strength of the electrical armature current at the start of the short-circuit braking to be less than the electrical current strength of the electrical field current. Preferably, the control and/or regulating unit is provided to adjust the electrical current strength of the electrical armature current to be less than the electrical current strength of the electrical field current for at least 5 ms, particularly preferably for at least 10 ms, from the start of the short-circuit braking. Preferably, the control and/or regulating unit can adjust the electrical current strength of the electrical armature current to be less than the electrical current strength of the electrical field current from the start of the short-circuit braking for longer than 10 ms, in particular depending on the system design and/or the powertrain design of the device comprising the brake device. In particular, following a reduction in the electrical current strength of the electrical armature current in comparison to the electrical current strength of the electrical field current, the control and/or regulating unit can allow an increase in the electrical current strength, in particular up to a value of the electrical current strength of the electrical field current. Advantageously, the electrical current strength of the electrical armature current can be reduced. Advantageously, contact problems in the commutator system can be prevented and a reproducible braking profile can be achieved.

Furthermore, it is proposed that the brake device comprises at least one detection unit at least for detection of the electrical field current. The detection unit is preferably provided for measurement of the electrical field current, in particular for measurement of the electrical current strength of the electrical field current and/or for measurement of the time profile of the electrical field current. Preferably, the detection unit can be designed as a part of the control and/or regulating unit, for example integrated in an electrical or electronic control circuit. In particular, the detection unit can be designed at least partially as a current measurement resistor or the like. Alternatively, it is conceivable that the detection unit is designed as a current measuring device, in particular separate from the control and/or regulating unit, such as an amperemeter or the like. Advantageously, the electrical field current, in particular the electrical current strength of the electrical field current, can be detected.

It is also proposed that the detection unit is provided to provide at least one piece of information about the electrical field current to the control and/or regulating unit and that the control and/or regulating unit is provided to control and/or regulate the electrical armature current depending on the information. Preferably, the detection unit is provided to provide the control and/or regulating unit with the information about the electrical field current as an electrical signal, in particular via an electrical line. Preferably, the detection unit is provided to provide the control and/or regulating unit with the in particular currently recorded electrical current strength of the electrical field current. Alternatively or additionally, it is conceivable that the detection unit is provided to provide the control and/or regulating unit with the time profile of the electrical field current. Preferably, the control and/or regulating unit is designed to provide the information as the input variable for the control and/or regulation of a controlled variable. Preferably, the controlled variable is designed as the electrical armature current, in particular as the electrical current strength of the electrical armature current. Preferably, the control and/or regulating unit is provided to control and/or regulate the electrical current strength of the electrical armature current depending on the recorded electrical current strength of the electrical field current during short-circuit braking of the electric motor. In particular, the control and/or regulating unit is provided to at least temporarily adjust the electrical current strength of the electrical armature current to be less than the detected electrical current strength of the electrical field current during the short-circuit braking of the electric motor. Preferably, a constant field current and an increasing armature current can be adjusted by control and/or regulation of the electrical armature current depending on the electrical field current during a decrease in the motor speed of the electric motor, in particular due to the short-circuit braking. Advantageously, a current reduction in the commutator system can be achieved by means of a constant field current, which in turn advantageously allows a plurality of braking processes of a thermal overload-free electric motor.

It is also proposed that the control and/or regulating unit and a detection unit are at least partially formed in one piece. Preferably, the detection unit is designed as the detection unit which is designed for detection of the electrical field current. Alternatively, it is conceivable that the brake device, in addition to the detection unit for detecting the electrical field current, will have a further detection unit, at least partially designed in one piece with the control and/or regulating unit. In particular, the detection unit is at least partially, preferably fully, integrated into the control and/or regulating unit. Preferably, the detection unit is a component of an electrical or electronic control circuit formed by the control and/or regulating unit. Preferably, the detection unit is designed such that the electrical field current for detection flows at least partially through the detection unit, in particular through a part of the electrical or electronic control unit forming the detection unit. Advantageously, detected information can be provided with low latency. Advantageously, particularly precise armature current control can be enabled.

Furthermore, the disclosure is based on a method for the operation of a brake device, in particular a brake device according to the disclosure.

It is proposed that an electrical armature current flowing through an armature winding is reduced at least temporarily during short-circuit braking of an electric motor in at least one step of the method. Advantageously, a braking time of an electric motor can be minimized reproducibly. Advantageously, brake failures during short-circuit braking can be prevented. Heating of an armature winding and wear on a commutator system can be kept advantageously low.

It is also proposed that the electrical current strength of the electrical armature current is at least temporarily adjusted to be less than the electrical current strength of an electrical field current during short-circuit braking of the electric motor in at least one step of the method. Advantageously, the electrical current strength of the electrical armature current can be reduced. Advantageously, contact problems in the commutator system can be prevented and a reproducible braking profile can be achieved.

Furthermore, it is proposed that the electrical field current is detected in at least one step of the method. Advantageously, in particular the electrical current strength of the electrical field current can be detected.

In addition, it is proposed that in at least one step of the method, at least one piece of information about an electrical field current is provided and that the electrical armature current is controlled and/or regulated depending on the information. Advantageously, a current reduction in the commutator system can be achieved by means of a constant field current, which in turn advantageously enables a plurality of braking operations of a thermal overload-free electric motor.

Furthermore, the disclosure is based on a machine tool with at least one electric motor and with at least one brake device according to the disclosure. The electric motor is preferably designed as a universal motor. The machine tool may be designed in particular as a circular saw, as a jigsaw, as a drilling machine, as an angle grinder or as another machine tool that appears to be useful to a person skilled in the art. Preferably, the machine tool comprises other components, in particular required for driving the machine tool. In particular, the machine tool may comprise at least one energy supply unit, such as an accumulator, a mains power supply or the like, a tool chuck, a housing, and/or other components which a person skilled in the art considers reasonable. Advantageously, a long-lasting, user-safe, and cost-effective machine tool can be provided.

The brake device according to the disclosure, the method according to the disclosure and/or the machine tool according to the disclosure should not be limited hereby to the application and embodiment described above. In particular, the brake device according to the disclosure, the method according to the disclosure and/or the machine tool according to the disclosure for fulfillment of a herein described function may have a different number from the herein specified number of individual elements, components and units as well as steps of the method. In addition, in the ranges of values specified in this disclosure, values within the limits mentioned shall be considered as disclosed and can be used as desired.

BRIEF DESCRIPTION OF THE DRAWINGS

Other advantages are given in the following description of the drawings. An exemplary embodiment of the disclosure is shown in the drawings. The drawings and the description contain numerous features in combination. The person skilled in the art will also consider the features individually and combine them into meaningful further combinations.

In the Figures.

DETAILED DESCRIPTION

Figure 1:
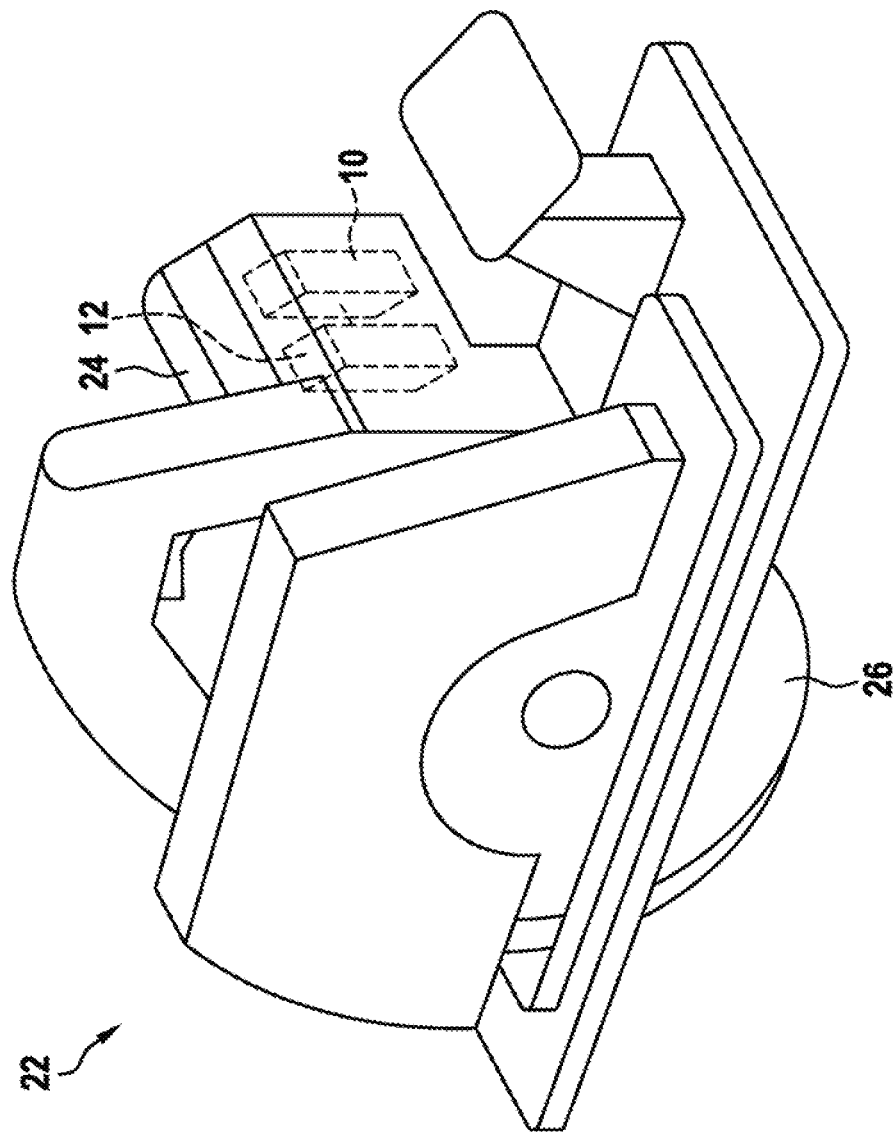
FIG. 1 shows a machine tool according to the disclosure in a schematic representation.

FIG. 1 shows a machine tool 22 in a schematic representation. The machine tool 22 is designed as a hand tool. The machine tool 22 is designed as a circular saw. Alternatively, it is conceivable that the machine tool 22 is designed as a drilling machine, as a jigsaw, as an angle grinder or the like. The machine tool 22 has a housing unit 24. The machine tool 22 has an electric motor 12. The electric motor 12 is designed as a universal motor. The electric motor 12 is arranged within the housing unit 24. The electric motor 12 is provided to drive an insert tool 26 of the machine tool 22. The insert tool 26 is designed as a circular saw blade. The machine tool 22 has a brake device 10 for the electric motor 12. The brake device 10 is arranged within the housing unit 24 of the machine tool 22.

Figure 2:
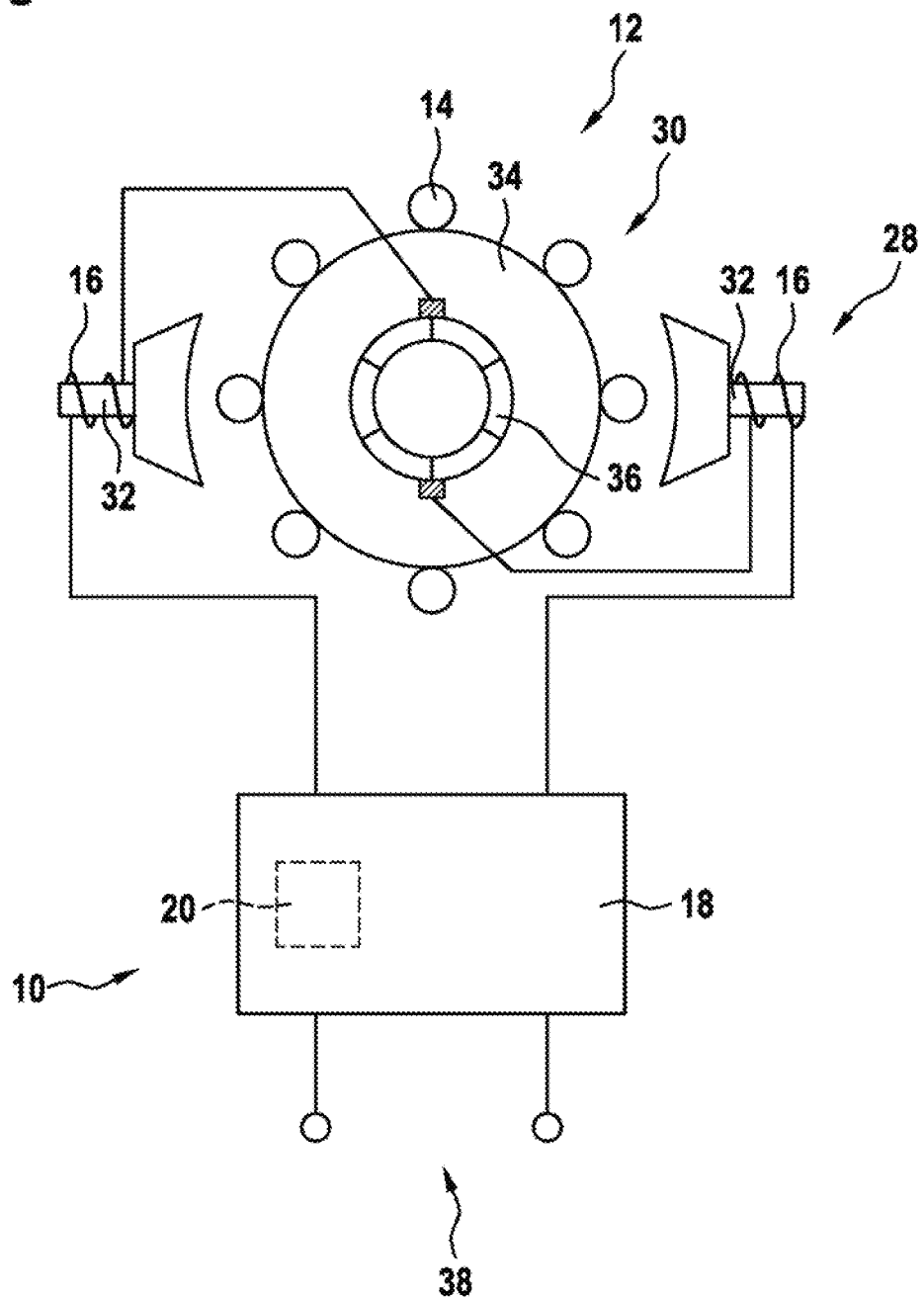
FIG. 2 shows a brake device according to the disclosure in a schematic representation and FIG. 3 shows a diagram of current profiles during short-circuit braking by means of the brake device.

FIG. 2 shows a brake device 10 for the electric motor 12 in a schematic representation. The electric motor 12 has a stator 28 and an armature 30. The stator 28 is designed as a static component, which is self-movement-free relative to the armature 30 during operation of the electric motor 12. The armature 30 is designed as a movably mounted component, which is movable relative to the stator 28 during operation of the electric motor 12. The armature 30 is designed as a rotationally movably mounted component, which can be rotated relative to the stator 28 during operation of the electric motor 12. The stator 28 has a stator base body 32. The armature 30 has an armature base body 34. The stator base body 32 and the armature base body 34 are each formed from a plurality of interconnected layers of electroplate. The electric motor 12 has an armature winding 14 and a field winding 16. The armature winding 14 is formed from an elongated electrically conductive conducting element. The field winding 16 is formed from two further elongated electrically conductive conducting elements. The conducting elements are each formed of an electrically conductive wire. The conducting elements each have an electrically insulating isolation layer. The two further conduction elements are wound essentially coil-like around the stator base body 32 to form the field winding 16. A conducting element is wound essentially coil-like around the armature base body 34 to form the armature winding 14.

The electric motor 12 is designed as an internal rotor motor. The armature 30 of the electric motor 12, which is designed as an internal rotor motor, rotates during operation of the inner rotor motor surrounded by the stator 28 of the electric motor 12, which is designed as an internal rotor motor. The electric motor 12 is designed as a universal motor. The electric motor 12 can be operated with both electrical direct voltage and electrical alternating voltage. The electric motor 12 has a commutator system 36. The commutator system 36 is provided for correct energization of the armature winding 14. The armature 30 can be set in rotation by correct energization of the electric motor 12. For example, the electric motor 12 can drive a drive shaft of the machine tool 22 or the like by means of the rotating armature 30. For short-circuit braking of the electric motor 12, the electric motor 12 is electrically short-circuited. For short-circuit braking of the electric motor 12, the field winding 16 and the armature winding 14 are electrically short-circuited. During short-circuiting of the electric motor 12, a counter-electromotive force acts, which causes an electrical short-circuit current. An electrical short-circuit current flowing through the armature winding 14 during short-circuit braking of the electric motor 12 is an electrical armature current. An electrical short-circuit current flowing through the field winding 16 during short-circuit braking of the electric motor 12 is an electrical field current.

The brake device 10 has a control and/or regulating unit 18. The control and/or regulating unit 18 is provided for the control and/or regulation of an electrical current through the armature winding 14 and/or through the field winding 16. The control and/or regulating unit 18 is provided to at least temporarily reduce an electrical armature current flowing through the armature winding 14 during short-circuit braking of the electric motor 12. The control and/or regulating unit 18 is designed as an electronic control circuit. Alternatively, it is conceivable that the control and/or regulating unit 18 is designed as a microprocessor, as a microcomputer, as an electrical control circuit, as an integrated circuit or the like. The control and/or regulating unit 18 is provided for control and/or regulation of the energization of the electric motor 12 during operation of the electric motor 12. The control and/or regulating unit 18 can control and/or regulate an electrical energy flow from an energy supply unit 38 to the electric motor 12. The energy supply unit 38 can be designed as an accumulator, as a mains voltage supply or the like. Alternatively, it is conceivable that the control and/or regulating unit 18 is provided only for the control and/or regulation of short-circuit braking. The control and/or regulating unit 18 is provided to initiate the short-circuit braking. The control and/or regulating unit 18 is provided to initiate the short-circuit braking depending on a signal, for example from a sensor, from a user or the like. The control and/or regulating unit 18 is provided to at least temporarily reduce the electrical current strength of the electrical armature current during short-circuit braking of the electric motor 12. The control and/or regulating unit 18 is provided to at least temporarily reduce the electrical armature current compared to an electrical armature current for the same operating parameters and during unregulated short-circuit braking of the electric motor 12. The control and/or regulating unit 18 is provided to reduce the electrical armature current at the start of the short-circuit braking. The control and/or regulating unit 18 is provided to preferably reduce the electrical armature current for at least 5 ms, particularly preferably for at least 10 ms, from the start of the short-circuit braking. The control and/or regulating unit 18 may reduce the electrical armature current from the start of the short-circuit braking for longer than 10 ms, in particular depending on a system design and/or a powertrain design of the machine tool 22. The control and/or regulating unit 18 may reduce the electrical armature current by controlling electrical or electronic components of the brake device 10, such as resistors, diodes, capacitors, transistors, in particular MOSFETs and/or IGETs, or the like, by at least partial dissipation of the electrical armature current, for example in a freewheeling circuit or the like, and/or similar measures. The control and/or regulating unit 18 can allow an increase in the electrical armature current after a reduction of the armature current.

The control and/or regulating unit 18 is provided to at least temporarily adjust the electrical current strength of the electrical armature current to be less than an electrical current strength of an electrical field current flowing through the field winding 16 during short-circuit braking of the electric motor 12. The electrical armature current and the electrical field current exhibit an at least substantially identical electrical current strength and at least substantially identical time profile during unregulated short-circuit braking of the electric motor 12. The control and/or regulating unit 18 is provided to adjust the electrical current strength of the electrical armature current at the start of the short-circuit braking to be less than the electrical current strength of the field current. The control and/or regulating unit 18 is provided to adjust the electrical current strength of the electrical armature current to be less than the electrical current strength of the electrical field current preferably for at least 5 ms, particularly preferably for at least 10 ms, from the start of the short-circuit braking. The control and/or regulating unit 18 can adjust the electrical current strength of the electrical armature current to be less than the electrical current strength of the electrical field current for more than 10 ms from the start of the short-circuit braking, in particular depending on the system design and/or the powertrain design of the machine tool 22. The control and/or regulating unit 18 may allow an increase in the electrical current strength of the electrical armature current following a reduction in the electrical current strength compared to the electrical current strength of the electrical field current. The control and/or regulating unit 18 may allow an increase in the electrical current strength of the electrical armature current up to a value of the electrical current strength of the electrical field current following a reduction in the electrical current strength of the electrical armature current compared to the electrical current strength of the electrical field current.

The brake device 10 comprises a detection unit 20 for detection of the electrical field current. The detection unit 20 is provided to measure the electrical current strength of the electrical field current and/or to measure the time profile of the electrical field current. The detection unit 20 is designed as a component of the control and/or regulating unit 18. Alternatively, it is conceivable that the detection unit 20 is designed separately from the control and/or regulating unit 18. The detection unit 20 is designed as a current measurement resistor. Alternatively, it is conceivable that the detection unit 20 is designed as a current meter, such as an amperemeter or the like.

The detection unit 20 is provided to provide the control and/or regulating unit 18 with at least one piece of information about the electrical field current. The control and/or regulating unit 18 is provided to control and/or regulate the electrical armature current depending on the information. The detection unit 20 is provided to provide the control and/or regulating unit 18 with information about the electrical field current as an electrical signal. The detection unit 20 is provided to provide the control and/or regulating unit 18 with a currently detected electrical current strength of the electrical field current. Alternatively or additionally, it is conceivable that the detection unit 20 is provided to provide the control and/or regulating unit 18 with the time profile of the electrical field current. The control and/or regulating unit 18 is provided to use the information as an input variable for the control and/or regulation of a controlled variable. The controlled variable is designed as the electrical armature current. The controlled variable is designed as the electrical current strength of the electrical armature current. The control and/or regulating unit 18 is provided to control and/or regulate the electrical current strength of the electrical armature current depending on the detected electrical current strength of the electrical field current during short-circuit braking of the electric motor 12. The control and/or regulating unit 18 is provided to at least temporarily adjust the electrical current strength of the electrical armature current to be less than the detected electrical current strength of the electrical field current during short-circuit braking of the electric motor 12. Preferably, a constant field current and an increasing armature current can be set by control and/or regulation of the electrical armature current depending on the electrical field current in the case of decreasing motor speed of the electric motor 12 due to short-circuit braking.

The control and/or regulating unit 18 and a detection unit 20 are at least partially formed in one piece. The detection unit 20 is designed as the detection unit 20 which is designed for the detection of the electrical field current. Alternatively, it is conceivable that the brake device 10, in addition to the detection unit 20 for detecting the electrical field current, has a further detection unit, which is at least partially formed in one piece with the control and/or regulating unit 18. The detection unit 20 is at least partially integrated into the control and/or regulating unit 18. The detection unit 20 is fully integrated into the control and/or regulating unit 18. The detection unit 20 is part of the electronic control circuit formed by the control and/or regulating unit 18. The detection unit 20 is formed in such a way that the electrical field current for detection flows at least partially through the detection unit 20. The electrical field current flows through a part of the electronic control circuit designed as the detection unit 20.

Figure 3:
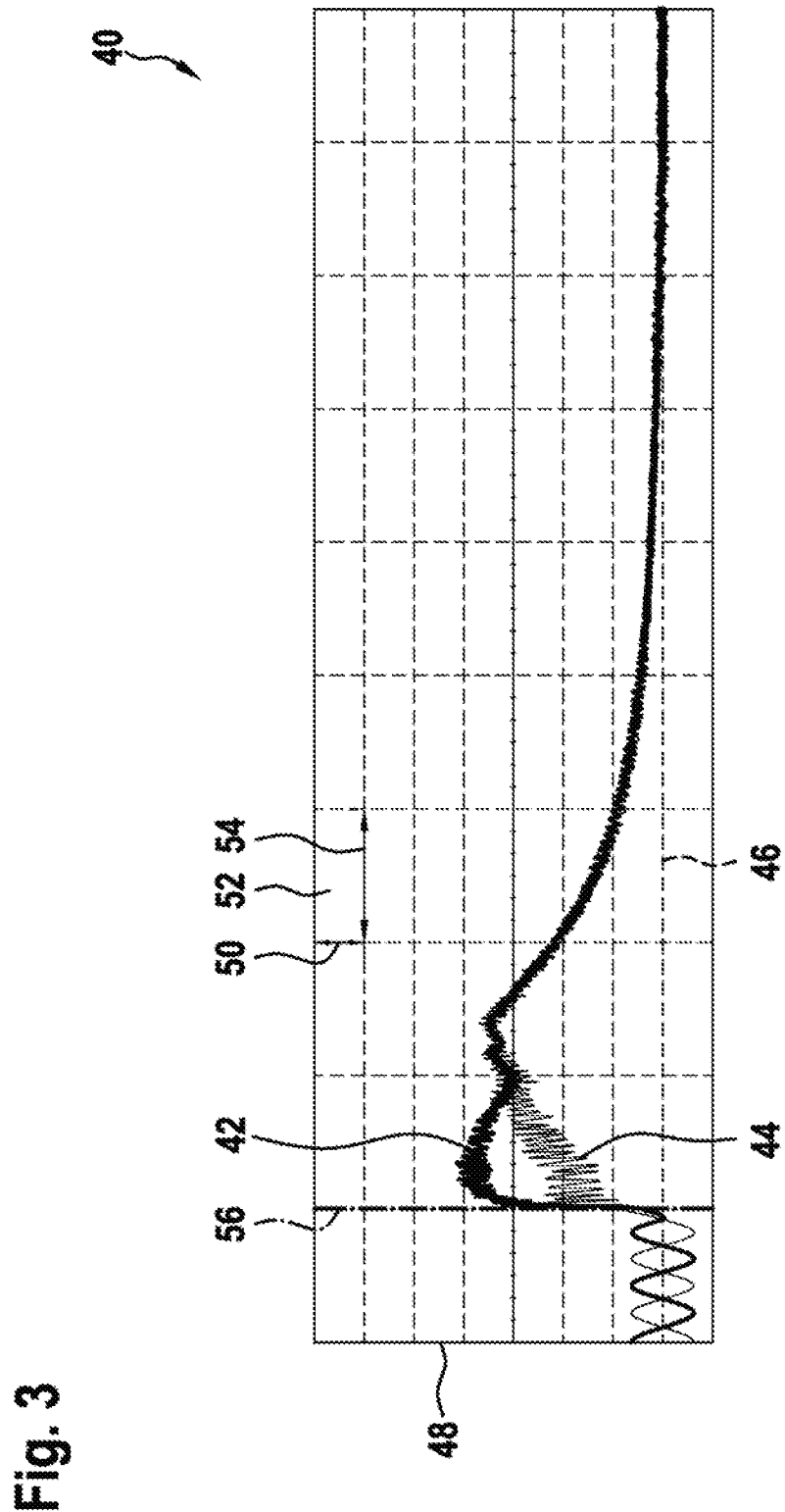

FIG. 3 shows a diagram 40 of current profiles 42, 44 during short-circuit braking by means of the brake device 10. The diagram 40 has an abscissa axis 46 and an ordinate axis 48. A duration is plotted on the abscissa axis 46. An electrical current strength is plotted on the ordinate axis 48. A height 50 of a box 52 corresponds to an electrical current of 10 A. A width 54 of a box 52 corresponds to a duration of 50 ms. A dashed line 56 marks the start of the short-circuit braking. The electrical field current is represented by a first current profile 42. The electrical armature current is represented by a second current profile 44. Before the short-circuit braking, the electrical field current and the electrical armature current have essentially the same electrical current strengths of a maximum of approx. 5 A. Before the short-circuit braking, the electrical field current and the electrical armature current are phase shifted relative to each other. At the start of the short-circuit braking, the electrical armature current is reduced by the control and/or regulating unit 18. The electrical current strength of the electrical armature current is adjusted to be less than the electrical current strength of the electrical field current. Following an increase in the electrical field current at the start of the short-circuit braking, the electrical field current remains essentially constant until approx. 70 ms after the start of the short-circuit braking. Following the reduction at the start of the short-circuit braking, the electrical armature current increases until it coincides with the electrical field current. From approx. 70 ms after the short-circuit braking, both the electrical current strength of the electrical field current and the electrical current strength of the electrical armature current decrease exponentially.

A method for the operation of the brake device 10 is described below. In at least one step of the method, the electrical armature current flowing through the armature winding 14 is reduced at least temporarily during short-circuit braking of the electric motor 12. In at least one other step of the method, the electrical current strength of the electrical armature current is at least temporarily adjusted to be less than the electrical current strength of the electrical field current during short-circuit braking of the electric motor 12. In at least one other step of the method, the electrical field current is detected. In at least one other step of the method, at least one piece of information will be provided about the electrical field current and the electrical armature current will be controlled and/or regulated depending on the information. With regard to further steps of the method for operating the brake device 10, reference may be made to the previous description of the brake device 10, since this description is also to be read analogously for the method and therefore all the features relating to the brake device 10 shall also be deemed to be disclosed with regard to the method of operation of the brake device 10.

The invention claimed is:

1. A brake device for an electric motor, the electric motor having at least one armature winding and at least one field winding, the brake device comprising:
   at least one controller configured to control at least one electrical current flowing through at least one of (i) the at least one armature winding and (ii) at least one the field winding, the controller being configured to at least temporarily adjust an electrical current strength of an electrical armature current flowing through the at least one armature winding to be less than an electrical current strength of an electrical field current flowing through the at least one field winding during short-circuit braking of the electric motor.

2. The brake device as claimed in claim 1 further comprising:
   at least one detection device configured to detect the electrical field current.

3. The brake device as claimed in claim 2, wherein:
   the at least one detection device is configured to provide at least one piece of information about the electrical field current to the controller; and
   the controller is configured to control the electrical armature current based on the at least one piece of information.

4. The brake device as claimed in claim 2, wherein the controller and the at least one detection device are at least partially formed as one piece.

5. A method for operating a brake device for an electric motor having at least one armature winding and at least one field winding, the method comprising:
   at least temporarily adjusting, with at least one controller of the brake device, an electrical current strength of an electrical armature current flowing through the at least one armature winding to be less than an electrical current strength of an electrical field current flowing through the at least one field winding during short-circuit braking of the electric motor.

6. The method as claimed in claim 5 further comprising:
   detecting the electrical field current.

7. The method as claimed in claim 6 further comprising:
   providing at least one piece of information about an electrical field current; and
   controlling the electrical armature current based on the at least one piece of information.

8. A machine tool comprising:
   at least one electric motor having at least one armature winding and at least one field winding; and
   at least one brake device having at least one controller configured to control at least one electrical current flowing through at least one of (i) the at least one armature winding and (ii) at least one the field winding, the controller being configured to at least temporarily adjust an electrical current strength of an electrical armature current flowing through the at least one armature winding to be less than an electrical current strength of an electrical field current flowing through the at least one field winding during short-circuit braking of the electric motor.

\* \* \* \* \*